(12) United States Patent
Kanakogi

(10) Patent No.: US 9,058,164 B2
(45) Date of Patent: *Jun. 16, 2015

(54) POWER CONSUMPTION REDUCTION IN A MULTIPROCESSOR SYSTEM

(75) Inventor: Tomochika Kanakogi, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 666 days.

This patent is subject to a terminal disclaimer.

(21) Appl. No.: 12/974,124

(22) Filed: Dec. 21, 2010

(65) Prior Publication Data

US 2011/0087909 A1 Apr. 14, 2011

Related U.S. Application Data

(63) Continuation of application No. 11/525,306, filed on Sep. 22, 2006, now Pat. No. 7,882,379.

(51) Int. Cl.
*G06F 1/32* (2006.01)
*G06F 9/52* (2006.01)

(52) U.S. Cl.
CPC .............. *G06F 1/3203* (2013.01); *G06F 1/324* (2013.01); *G06F 9/526* (2013.01); *Y02B 60/1217* (2013.01)

(58) Field of Classification Search
CPC ... G06F 1/3202; G06F 1/3203; G06F 1/3231; G06F 1/26; G06F 1/206; G06F 1/3228; G06F 1/08; G06F 1/3289; G06F 1/266; H04L 12/12; H04L 12/10
USPC ........................................ 713/300, 322, 323
See application file for complete search history.

(56) References Cited

U.S. PATENT DOCUMENTS

| | | | |
|---|---|---|---|
| 5,724,591 A | 3/1998 | Hara et al. | |
| 5,768,550 A | 6/1998 | Dean et al. | |
| 5,774,704 A | 6/1998 | Williams | |
| 6,006,299 A | 12/1999 | Wang et al. | |
| 6,137,804 A | 10/2000 | Allison et al. | |
| 6,192,479 B1 * | 2/2001 | Ko | 713/300 |
| 6,223,297 B1 * | 4/2001 | Inoue | 713/501 |

(Continued)

OTHER PUBLICATIONS

Office Action for related U.S. Appl. No. 11/525,306, Apr. 23, 2009.

(Continued)

*Primary Examiner* — Zahid Choudhury
(74) *Attorney, Agent, or Firm* — Matthew B. Dernier, Esq.; Gibson & Dernier LLP

(57) ABSTRACT

Methods and apparatus provide for reducing power consumption by decreasing operating frequencies of waiting processors in a multiprocessor system. Power consumption may be reduced by having a processor enter a low frequency mode when the processor is in a loop waiting for data that have been locked by another processor. The frequency of operation of the waiting processor may be reduced to a fraction (one half, one quarter, etc.) of the normal, initial clock frequency. The multiprocessor system may monitor a number of times (loop count) that a waiting processor takes the wait loop and compare the number to a threshold. When the loop count is greater than or equal to the threshold, the clock frequency of the waiting processor is reduced. When the waiting processor ceases to wait and does not take the wait loop branch (e.g., because the other processor has released the lock on the data), the loop count is reset to zero and the frequency of operation of waiting processor is increased to an increased frequency, such as the normal, initial level.

24 Claims, 10 Drawing Sheets

(56) References Cited

U.S. PATENT DOCUMENTS

| | | |
|---|---|---|
| 6,233,690 B1 * | 5/2001 | Choi et al. .................... 713/322 |
| 6,446,215 B1 * | 9/2002 | Meyer et al. ................. 713/310 |
| 6,526,491 B2 | 2/2003 | Suzuoki et al. |
| 6,684,342 B1 | 1/2004 | Kelsey et al. |
| 6,745,335 B1 | 6/2004 | Kusano |
| 6,874,080 B2 | 3/2005 | Wishneusky |
| 6,928,566 B2 | 8/2005 | Nunomura |
| 6,990,598 B2 | 1/2006 | Sherburne, Jr. |
| 7,055,614 B1 | 6/2006 | Ide |
| 7,100,068 B2 * | 8/2006 | Shyu ............................ 713/600 |
| 7,225,277 B2 | 5/2007 | Johns et al. |
| 7,249,270 B2 | 7/2007 | Mansell et al. |
| 2003/0120963 A1 | 6/2003 | Jahnke |
| 2004/0098631 A1 | 5/2004 | Terrell, II |
| 2004/0215982 A1 * | 10/2004 | Subramanian et al. ........ 713/300 |
| 2006/0053143 A1 * | 3/2006 | Liu et al. ....................... 707/102 |
| 2007/0067675 A1 | 3/2007 | Wiglet et al. |
| 2008/0270711 A1 | 10/2008 | Kwon et al. |
| 2009/0164826 A1 * | 6/2009 | Kottke ........................... 713/375 |

OTHER PUBLICATIONS

Office Action for related U.S. Appl. No. 11/525,306, Oct. 20, 2009.
Office Action for related U.S. Appl. No. 11/525,306, Jun. 7, 2010.

* cited by examiner

FIG. 2
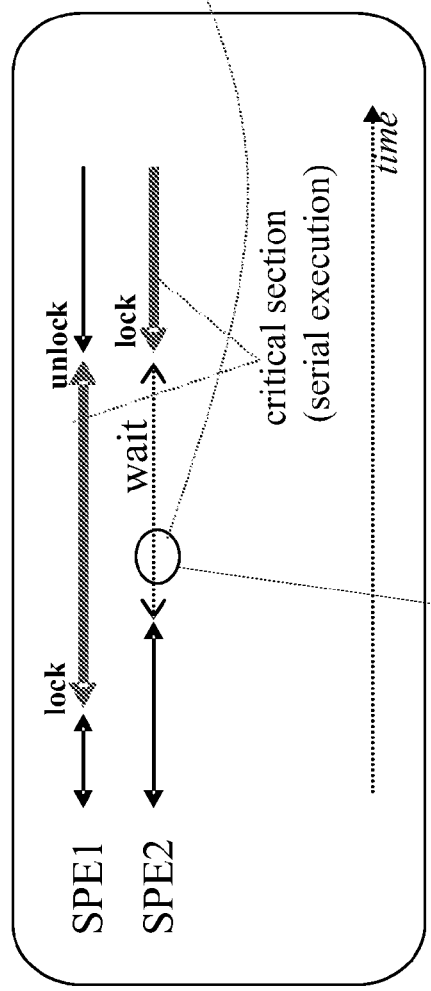
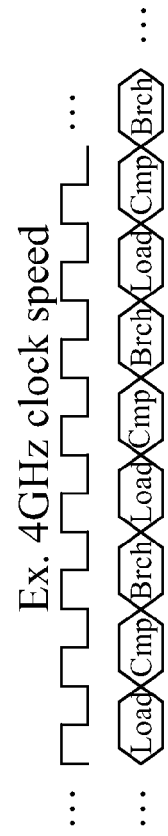

FIG. 4
Synchronization Operation
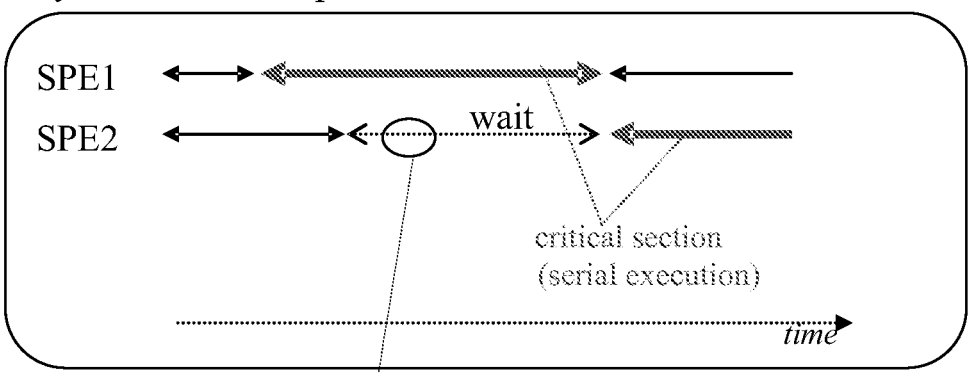
SPE2 processing
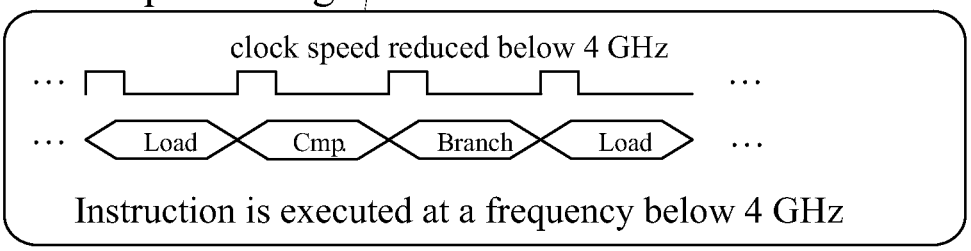
Instruction is executed at a frequency below 4 GHz

POWER CONSUMPTION REDUCTION IN A MULTIPROCESSOR SYSTEM

CROSS REFERENCE TO RELATED APPLICATIONS

This application is a continuation of U.S. patent application Ser. No. 11/525,306, filed Sep. 22, 2006, the entire disclosure of which is hereby incorporated by reference.

BACKGROUND

The present invention relates to methods and apparatus for reducing power consumption in multiprocessor systems. In particular, power consumption may be reduced by reducing an operating frequency of a processor in a loop cycle.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

For example, a multi-processor system may include a plurality of processors all sharing a common system memory, where each processor also has a local memory in which to execute instructions. The multi-processor system may also include an external interface, for example, to connect with other processing systems and/or other external devices to permit the sharing of data and resources. While this can achieve significant benefits in functionality, processing power, etc., the design of such systems may aggravate the problem of power consumption in some circumstances. The amount of power consumed depends not only on the number of processors in use, but also on the speed, or frequency, at which the processors are operating.

Power dissipation and the resulting battery usage may be a problem in a multiprocessing system employing a plurality of processors, particularly where the processors are running at high frequencies, such as 4 GHz or more. While faster processor frequencies are generally desirable, they have the undesirable effect of increasing power consumption. Due in part to a high operating frequency, a processor may consume undesirably high amounts of power even when waiting on other processors.

It would therefore be desirable to reduce power consumption by processors waiting on other devices.

SUMMARY OF THE INVENTION

In accordance with one or more features described herein, methods and apparatus provide for reducing power consumption by decreasing operating frequencies of waiting processors in a multiprocessor system. In accordance with one or more embodiments, the present invention contemplates having a processor enter a low frequency mode when the processor is in a loop waiting for data that have been locked by another processor. One or more aspects of the invention contemplate reducing the frequency of operation of the waiting processor, SPE2 in the above example, to a fraction (one half, one quarter, etc.) of the normal, initial clock frequency.

The present invention also contemplates monitoring a number of times (loop count) that the waiting processor takes the wait loop and comparing the number to a threshold. When the loop count is equal to or greater than the threshold, the clock frequency of the waiting processor is reduced. Assuming a threshold of "0x0002," when the number of times that SPE2 has taken the wait loop is equal to or greater than 0x0002, then the clock frequency of SPE2 is set to some reduced level (e.g., one half of the initial clock frequency).

When the waiting processor ceases to wait and does not take the wait loop branch (e.g., because SPE1 has released the lock on the data and a lock on the data is available to SPE2), the loop count is reset to zero and the frequency of operation of SPE2 is increased, such as to the initial level. This can significantly reduce power dissipation in the multiprocessor system.

In accordance with one or more further inventive aspects, a method or apparatus of reducing power consumption may include or perform some or all of the following actions: monitoring a number of times (loop count) that a waiting processor takes a wait loop; comparing the loop count to a threshold value; reducing the clock frequency of the waiting processor when the loop count equals or exceeds the threshold value; resetting the loop count to zero when the waiting processor ceases to wait and does not take the wait loop branch; and increasing the frequency of operation of the waiting processor when the loop count is reset to zero. The frequency may be increased to an increased frequency, the increase may be progressive, and the increased frequency may be a frequency less than, equal to, or greater than the initial frequency prior to reduction. Methods and apparatus additionally provide for monitoring the release by another processor of the lock on the data causing the waiting processor to wait; and progressively reducing the operating frequency of the waiting processor the higher the loop count.

In accordance with one or more further inventive aspects, an apparatus may include a loop count monitor, a frequency adjuster, an availability monitor, and a controller, the controller in communication with the loop count monitor, the frequency adjuster and the availability monitor, each of which is couplable to a plurality of processors. The loop count monitor may count the number of wait loops in a sequence taken by a processor and reflect the data to the controller. The controller may analyze the loop count data, such as compare the loop count against a threshold value, and configure the frequency adjuster to adjust the frequency of the processor, up or down, based on the analysis outcome. The components of the apparatus may be realized as separate circuitry, as functional aspects of other circuitry, and/or as software components of a system having the circuitry to perform the functional aspects.

In accordance with one or more further inventive aspects, a computer-readable storage medium may contain computer-executable instructions capable of causing a processing system to perform actions of a method of reducing power consumption. The actions may include: monitoring a number of times (loop count) that a waiting processor takes a wait loop; comparing the loop count to a threshold value; reducing the clock frequency of the waiting processor when the loop count equals or exceeds the threshold value; resetting the loop count to zero when the waiting processor ceases to wait and does not take the wait loop branch; and increasing the frequency of operation of the waiting processor when the loop count is reset to zero. The frequency may be increased to an increased frequency, the increase may be progressive, and the increased frequency may be a frequency less than, equal to, or greater than the initial frequency prior to reduction. The actions additionally may include: monitoring the release by another processor of the lock on the data causing the waiting processor to wait; and progressively reducing the operating frequency of the waiting processor the higher the loop count.

A preferred implementation of the present invention may utilize a microprocessor architecture known as Cell Broadband Engine Architecture, commonly abbreviated "CBEA," "Cell BE," or simply "Cell." The CBEA combines a lightweight general-purpose POWER-architecture core of modest performance with multiple GPU-like streamlined co-processing elements into a coordinated whole, with a sophisticated memory coherence architecture. POWER is a backronym for "Performance Optimization With Enhanced RISC" and refers to a RISC instruction set architecture, as well as a series of microprocessors that implements the instruction set architecture.

The CBEA greatly accelerates multimedia and vector processing applications, as well as many other forms of dedicated computation. The CBEA emphasizes efficiency over watts, bandwidth over latency, and peak computational throughput over simplicity of program code.

The CBEA can be split into four components: external input and output structures; the main processor called the POWER Processing Element ("PPE") (a two-way simultaneous multithreaded POWER 970 architecture compliant core); eight fully functional co-processors called the Synergistic Processing Elements ("SPEs"); and a specialized high bandwidth circular data bus connecting the PPE, input/output elements and the SPEs, called the Element Interconnect Bus ("EIB"). To achieve the high performance needed for mathematically intensive tasks such as decoding/encoding MPEG streams, generating or transforming three dimensional data, or undertaking Fourier analysis of data, the CBEA marries the SPEs and the PPE via the EIB to give the SPEs and the PPE access to main memory or other external data storage.

Within the Cell Broadband Engine Architecture, a Broadband Engine (BE) may include one or more PPEs. The PPE is capable of running a conventional operating system and has control over the SPEs, allowing it to start, stop, interrupt and schedule processes running on the SPEs. To this end, the PPE has additional instructions relating to control of the SPEs. Despite having Turing complete architectures, the SPEs are not fully autonomous and require the PPE to initiate them before they can do any useful work. Most of the "horsepower" of the system comes from the synergistic processing elements, SPEs.

Each SPE is composed of a "Streaming Processing Unit" ("SPU"), and a Synergistic Memory Flow (SMF) controller unit. The SMF may have a digital memory access (DMA), a memory management unit (MMU), and a bus interface. An SPE is a RISC processor with 128-bit single-instruction, multiple-data (SIMD) organization for single and double precision instructions. With the current generation of the CBEA, each SPE contains a 256 KiB instruction and data local memory area (called "local store") which is visible to the PPE and can be addressed directly by software. Each of these SPE can support up to 4 GB of local store memory, as static random access memory (SRAM). The local store does not operate like a conventional CPU cache since it is neither transparent to software nor does it contain hardware structures that predict what data to load.

An exemplary CBEA multiprocessing system may have eight valid SPEs in a common IC, giving it much flexibility in product implementation. For instance, as the CBEA is manufactured, one of the SPEs may become faulty and, therefore, the overall performance of the IC may be reduced. Instead of discarding the IC, the reduced performance multiprocessing system may be used in an application (e.g., a product) that does not require a full complement of SPEs. For example, a high performance video game product may require a full complement of SPEs; however, a digital television (DTV) might not require a full complement of SPEs. Depending on the complexity of the application in which the multiprocessing system is to be used, a lesser number of SPEs may be employed by disabling the faulty SPE and using the resulting multiprocessing system in a less demanding environment (such as a DTV).

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings, wherein like numerals indicate like elements, forms that are presently preferred, it being understood, however, that the invention is not limited to the precise arrangements and instrumentalities shown, but instead only by the claims. The drawings are only representative of the salient features, not to scale, and not intended to depict every aspect of operable embodiments.

FIG. 2 is a block diagram illustrating a simplified conceptualization of a synchronization operation.

FIG. 4 is a block diagram illustrating a simplified conceptualization of a synchronization operation in accordance with one or more aspects of the present invention.

DETAILED DESCRIPTION OF THE PRESENT INVENTION

Figure 1:
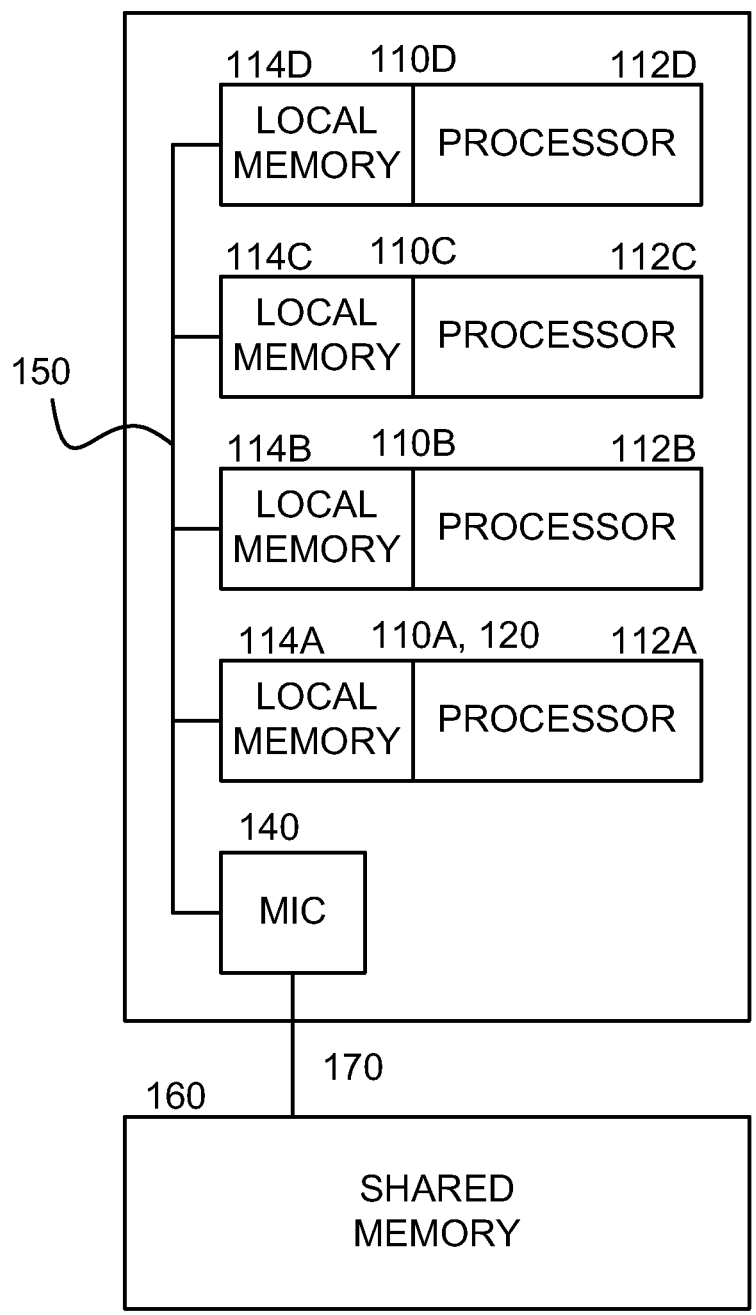
FIG. 1 is a block diagram illustrating the structure of a multiprocessing system having two or more sub-processors in accordance with one or more aspects of the present invention.

Referring to FIG. 1, a processing system 100 suitable for implementing one or more features of the present invention is shown. For the purposes of brevity and clarity, the block diagram of FIG. 1 will be referred to and described herein as illustrating an apparatus, it being understood, however, that the description may readily be applied to various aspects of a method with equal force.

The processing system 100 includes a plurality of processors 110A, 110B, 110C, and 110D, it being understood that any number of processors may be employed without departing from the spirit and scope of the invention. The processing system 100 also preferably includes a memory interface circuit 140 and a shared memory 160. At least the processors 110A, 110B, 110C, 110D, and the memory interface circuit 140 are preferably coupled to one another over a bus system 150 that is operable to transfer data to and from each component in accordance with suitable protocols.

Each of the processors 110A, 110B, 110C, 110D may be of similar construction or of differing construction. The processors may be implemented utilizing any of the known technologies that are capable of requesting data from the shared (or system) memory 160, and manipulating the data to achieve a desirable result. For example, the processors 110A, 110B, 110C, 110D may be implemented using any of the known microprocessors that are capable of executing software and/or firmware, including standard microprocessors, distributed microprocessors, etc. By way of example, one or more of the processors 110A, 110B, 110C, 110D may be a graphics processor that is capable of requesting and manipulating data, such as pixel data, including gray scale information, color information, texture data, polygonal information, video frame information, etc.

In an alternative embodiment, one or more of the processors 110A, 110B, 110C, 110D of the system 100 may take on the role as a main (or managing) processor 120. The system 100 may include a main processor 120, e.g. processor 110A, operatively coupled to the other processors 110B, 110C, 110D and capable of being coupled to the shared memory 160 over the bus system 150. The main processor 120 may schedule and orchestrate the processing of data by the other processors 110B, 110C, 110D. Unlike the other processors 110B, 110C, 110D, however, the main processor 120 may be coupled to a hardware cache memory, which is operable cache data obtained from at least one of the shared memory 160 and one or more of the local memories of the processors 110A, 110B, 110C, 110D. The main processor 120 may provide data access requests to copy data (which may include program data) from the system memory 160 over the bus system 150 into the cache memory for program execution and data manipulation utilizing any of the known techniques, such as DMA techniques.

The memory interface circuit 140 is preferably operable to facilitate data transfers between the processors 110A, 110B, 110C, 110D and the shared memory 160 such that the processors 110 may execute application programs and the like. By way of example, the memory interface circuit 140 may provide one or two high-bandwidth channels 170 into the shared memory 160 and may be adapted to be a slave to the bus system 150. Any of the known memory interface technologies may be employed to implement the memory interface circuit 140.

The system memory 160 is preferably a dynamic random access memory (DRAM) coupled to the processors 110A, 110B, 110C, 110D through the memory interface circuit 140. Although the system memory 160 is preferably a DRAM, the memory 160 may be implemented using other means, e.g., a static random access memory (SRAM), a magnetic random access memory (MRAM), an optical memory, a holographic memory, etc.

Turning again to the processors, each processor 110A, 110B, 110C, 110D preferably includes a processor core 112 (e.g., 112A-D) and a local memory 114 (e.g., 114A-D) in which to execute programs. These components may be integrally disposed on a common semi-conductor substrate or may be separately disposed as may be desired by a designer. The processor core 112 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core 112 may include an instruction buffer, instruction decode circuitry, dependency check circuitry, instruction issue circuitry, and execution stages.

The local memory 114 is coupled to the processor core 112 via a bus and is preferably located on the same chip (same semiconductor substrate) as the processor core 112. The local memory 114 is preferably not a traditional hardware cache memory in that there are no on-chip or off-chip hardware cache circuits, cache registers, cache memory controllers, etc. to implement a hardware cache memory function. As on chip space is often limited, the size of the local memory 114 may be much smaller than the shared memory 160.

The processors 112 preferably provide data access requests to copy data (which may include program data) from the system memory 160 over the bus system 150 into their respective local memories 114 for program execution and data manipulation. The mechanism for facilitating data access may be implemented utilizing any of the known techniques, for example the direct memory access (DMA) technique.

Referring to FIG. 2, a block diagram illustrates a simplified conceptualization of a synchronization operation. In the example of FIG. 2, one of the processors, e.g., SPE1, in the multiprocessing system may lock data that must remain unchanged by other processors, e.g. SPE2, for some length of time. As an example, SPE1 may need to run a series of execution steps, either on the data or without the data having been changed meanwhile. SPE1 thus sets the lock value associated with the data storage location(s) in memory or in special registers. By SPE1 placing a lock on the data, SPE2 may not access the data. If SPE2 is operating in synchronization and must operate on the locked data before moving on to another task, then SPE2 enters into a loop.

In the loop, SPE2 loads the lock value, compares the lock value, and branches to the wait loop if the lock value for the data indicates that a lock on the data is not available to SPE2. The wait period is generally a significant number of clock cycles. Thus, at 4 GHz SPE2 will draw a significant amount of power from the battery with no significant value added during the wait loop.

Figure 3:
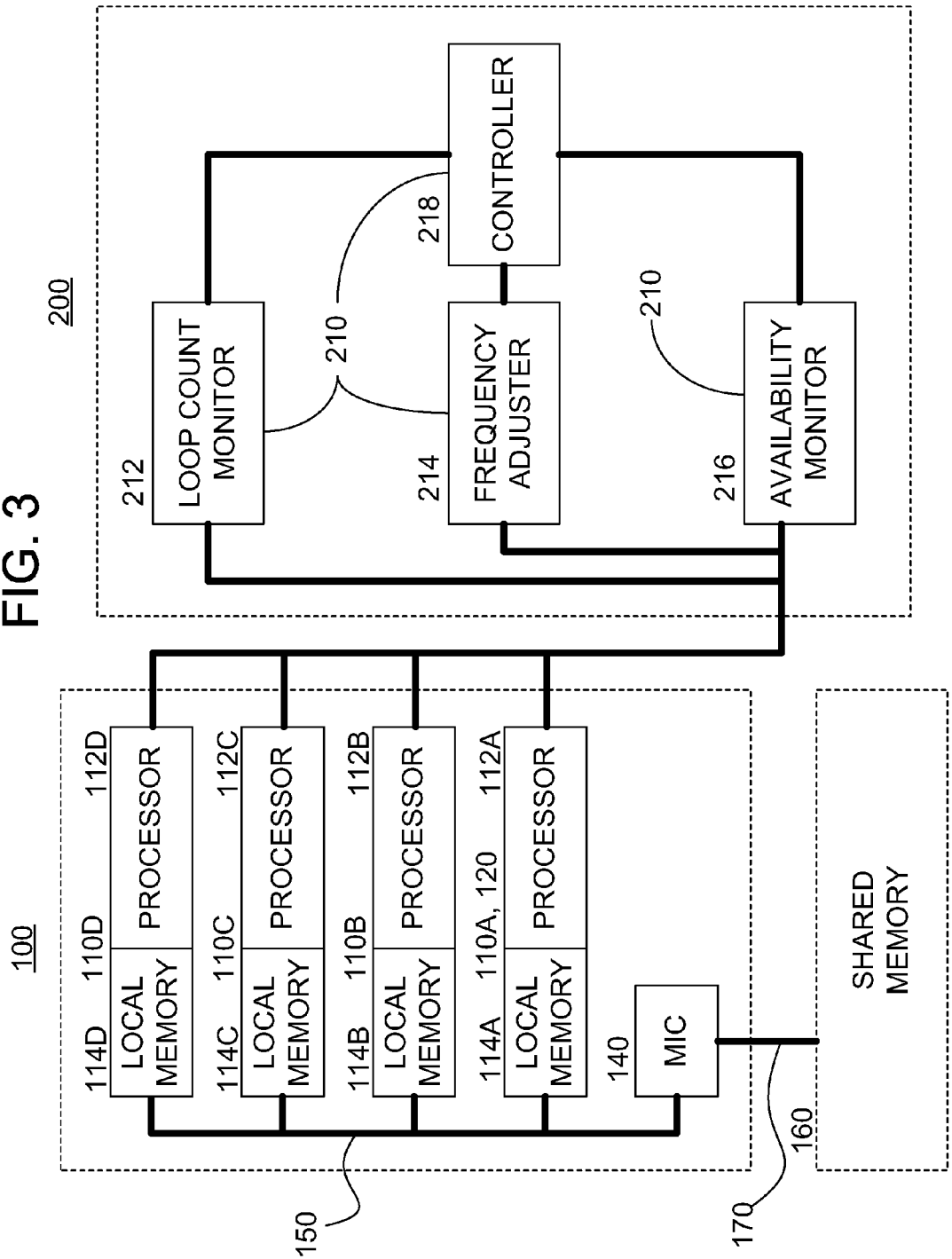
FIG. 3 is a block diagram illustrating the structure of a power consumption reduction tool in accordance with one or more preferred aspects of the present invention.

Referring to FIG. 3, a block diagram illustrates the structure of a power consumption reduction tool 200 in accordance with one or more preferred aspects of the present invention. The power consumption reduction tool 200 may include four main components 210: a loop count monitor 212 device or means, a frequency adjuster 214 device or means, an availability monitor 216 device or means, and a controller 218 device or means. Loop count monitor 212, frequency adjuster 214, and availability monitor 216 may be coupled to controller 218 as well as to a plurality of processors 110, such as of system 100, such as via bus 150 or channel 170.

Although depicted as an apparatus, the tool 200 may comprise any feasible combination of hardware and software that performs the necessary measurement and processing functions. The components 210 of the tool 200 may be realized as separate circuitry, as functional aspects of other circuitry, and/or as software components of a system 100 having the circuitry to perform the functional aspects. For example, tool 200 may comprise an existing diagnostic device or means that is modified to perform to a method in accordance with the present invention.

For example, controller 218 may have a single processor construction or a multi-processor structure similar, for instance, to that of processing system 100 shown in FIG. 1. To achieve the interconnection between tool components 210, processing system 100 may include an external interface circuit (not shown) that is adapted to facilitate data transfers between, for example, the system 100 and one or more of the other components 210 over a communications channel 170, such as an extension bus 150. Preferably, the external interface circuit is adapted to exchange non-coherent traffic with an external device and/or operate coherently by extending the bus system 150 to the other processing systems.

Referring to FIG. 4, a block diagram illustrates a simplified conceptualization of a synchronization operation in accordance with one or more aspects of the present invention. The synchronization operation may include the power consumption reduction tool 200 performing actions of an exemplary process set forth below. In the example of FIG. 4, one of the processors 110, e.g., SPE1, in the multiprocessing system may lock data that must remain unchanged by other processors, e.g. SPE2, for some length of time. As an example, SPE1 may need to run a series of execution steps, either on the data or without the data having been changed meanwhile. SPE1 thus sets the lock value associated with the data storage location(s) in memory or in special registers. By SPE1 placing a lock on the data, SPE2 may not access the data. If SPE2 is operating in synchronization and must operate on the locked data before moving on to another task, then SPE2 enters into a loop.

In the loop, SPE2 loads the lock value, compares the lock value, and branches to the wait loop if the lock value for the data indicates that a lock on the data is not available to SPE2. The wait period is generally a significant number of clock cycles. If SPE2 continued to operate at 4 GHz, it will draw a significant amount of power from the battery with no significant value added during the wait loop. However, in accordance with the present invention, upon looping more than a threshold number, the operating frequency of SPW2 would be reduced below 4 GHz, as indicated by the fewer cycles shown in the execution of the instructions (Load, Compare ("Cmp."), Branch).

Figure 5:
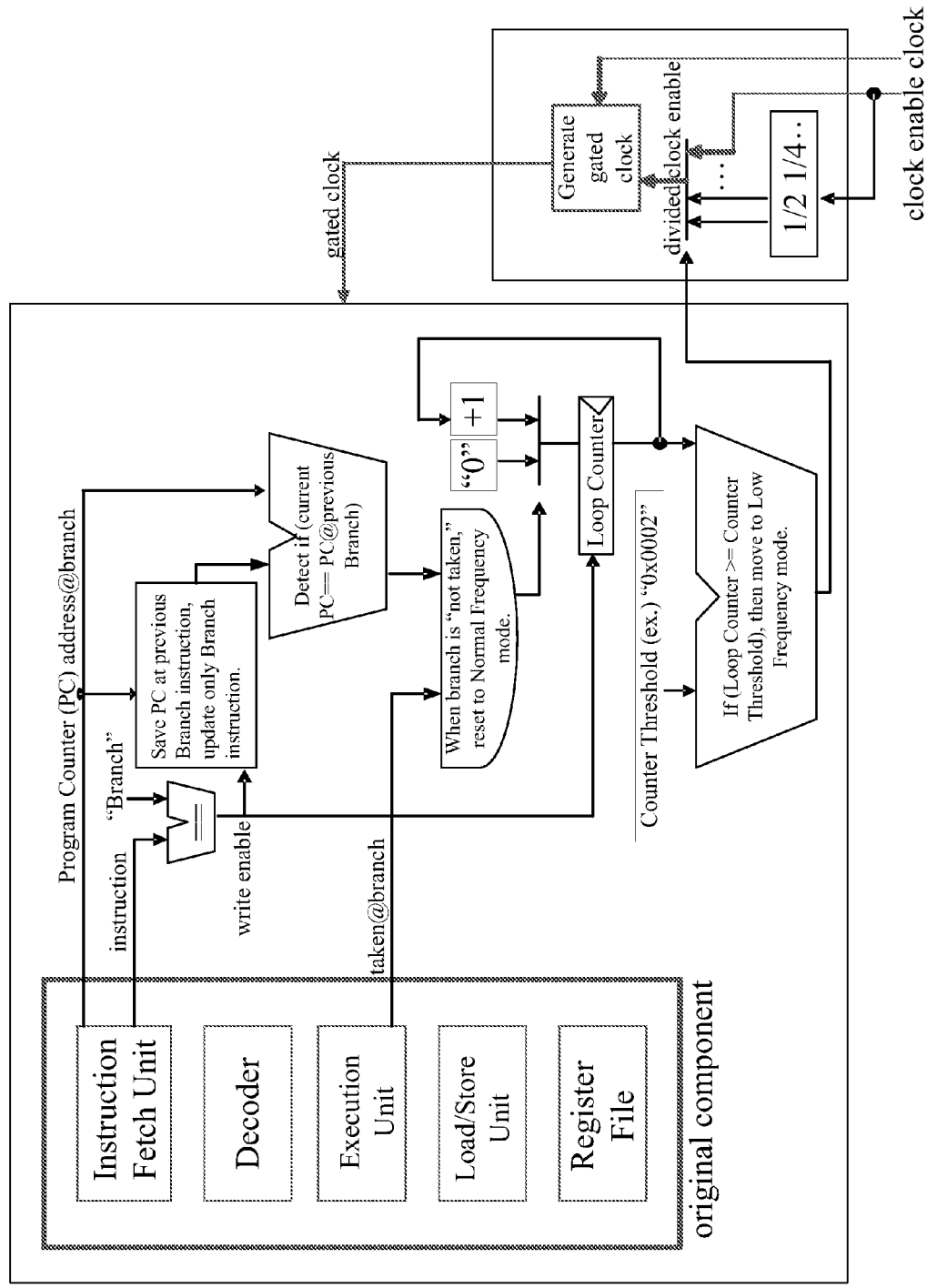
FIG. 5 is a flow diagram illustrating an exemplary algorithm of a synchronization operation in accordance with one or more preferred aspects of the present invention.

Referring to FIG. 5, a flow diagram illustrates an exemplary algorithm 400 of a synchronization operation in accordance with one or more preferred aspects of the present invention. The algorithm 400 of FIG. 5 depicts various aspects of the tool 200 of FIG. 3 and possible actions and results of the exemplary process 500 described in FIG. 6 below. The functionality of components 210 of tool 200 will be described in more detail in the context of process 500 of FIG. 6, in light of the exemplary algorithm 400.

Figure 6:
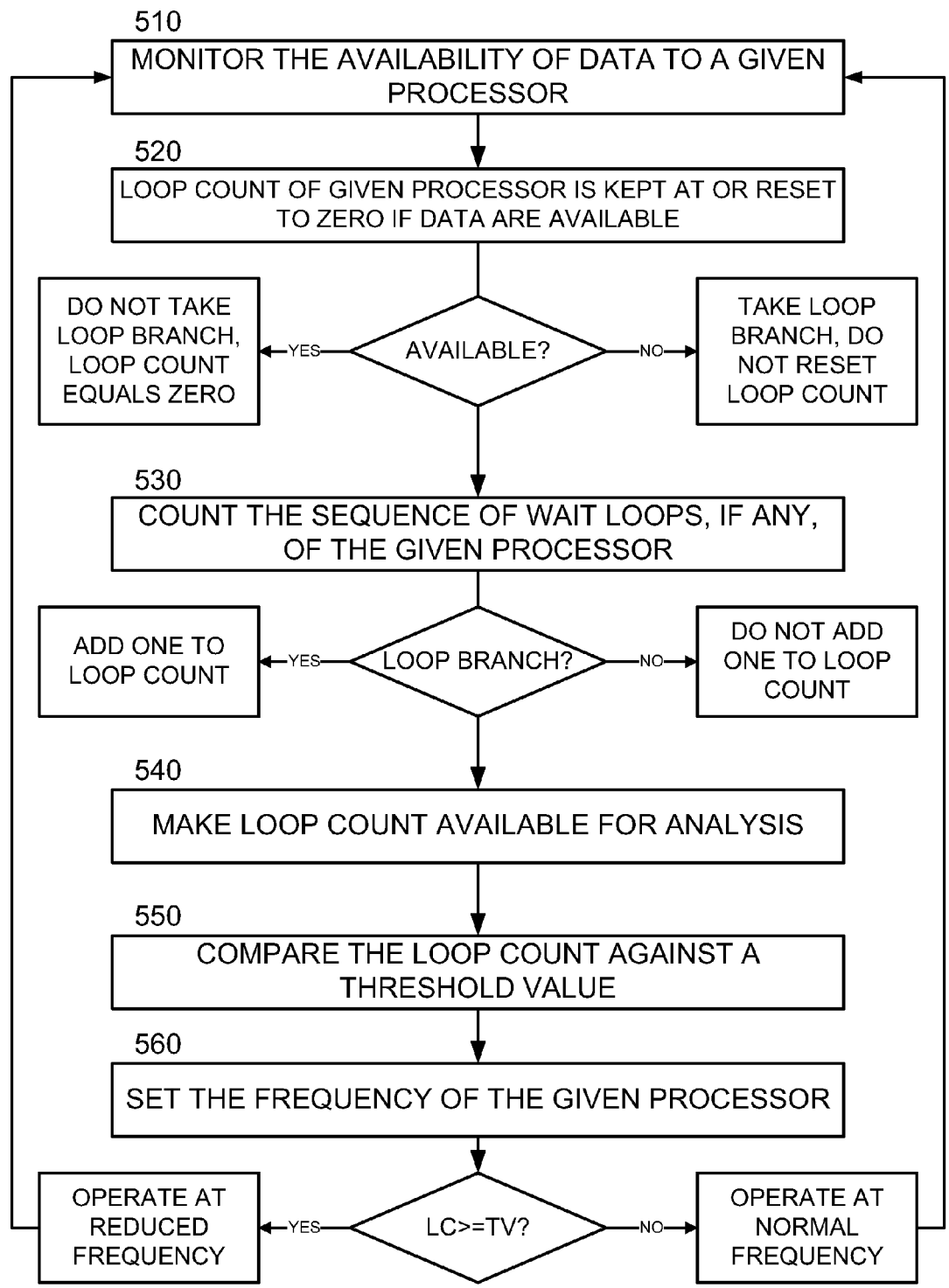
FIG. 6 is a flow diagram describing actions that may be carried out in an exemplary process in accordance with one or more preferred aspects of the present invention

Referring to FIG. 6, a flow diagram describing actions that may be carried out in an exemplary process 500 in accordance with one or more preferred aspects of the present invention. An exemplary process 500 of reducing power consumption based on reduction of processor frequencies during wait loops may include one or more of the following actions, depending on the circumstances.

In accordance with one or more embodiments of the present invention, the availability monitor 216 may monitor the availability of data (action 510). If the data are available, the loop count of the monitored processor is kept at or reset to zero (action 520). However, data may become unavailable when locked by a processor 110, causing another processor 110 to wait. The loop count monitor 212 may count the sequence of wait loops (action 530) taken by a processor 110, e.g., 110B. When the data are available to processor 110B, processor 110B does not take a wait loop, and the loop count remains zero. When the data are not available to processor 110B, processor 110B takes a wait loop, and the loop count increases by one for each wait loop taken.

The loop count monitor 212 may make the data available for analysis, such as by reflecting the data to the controller 218 (action 540). The controller 218 may analyze the loop count data, such as compare the loop count against a threshold value (action 550). Alternatively, the loop count monitor 212 may analyze the loop count data itself and communicate to the controller 218 the outcome.

The controller 218 may configure the frequency adjuster 214 (action 560) to set the frequency of the processor 110B based on the analysis outcome. The frequency may be held constant, adjusted up or adjusted down, depending on the circumstances. For example, if the loop count is reset to zero and therefore less than the threshold value, the operating frequency of processor 110B is returned to the normal, initial frequency of processor 110B. If the loop count is less than the threshold value, the operating frequency of processor 110B is set to normal. However, if the loop count is equal to or greater than the threshold value, the operating frequency of the processor 110B may be reduced. Moreover, the controller 218 may increase progressively the reduction in the operating frequency as the duration of the waiting period increases, e.g., as the loop count grows.

With respect to action 520, keeping at zero or resetting to zero the loop count upon the availability of data, data may become available by the release by processor 110A of the lock on the data causing the waiting processor 110B to wait. When the availability monitor 216 identifies that the lock on the data causing the waiting processor 110B to wait has been released, the availability monitor 216 may communicate this status to the loop count monitor 212 directly, which resets the loop count to zero and communicates the loop count to the controller 218. Alternatively, availability monitor 216 may communicate this status to the controller 218, which then resets the loop count monitor 212 to zero, or instructs the loop count monitor 212 to reset to zero. With the loop count reset to zero, the controller 218 instructs the frequency adjuster 214 to increase the frequency of operation of processor 110B to the normal, initial level. When the lock is released, the waiting processor 110B ceases to wait, does not take the wait loop branch, and itself may place a lock on the data, meanwhile operating at its normal, initial frequency again.

Figure 7:
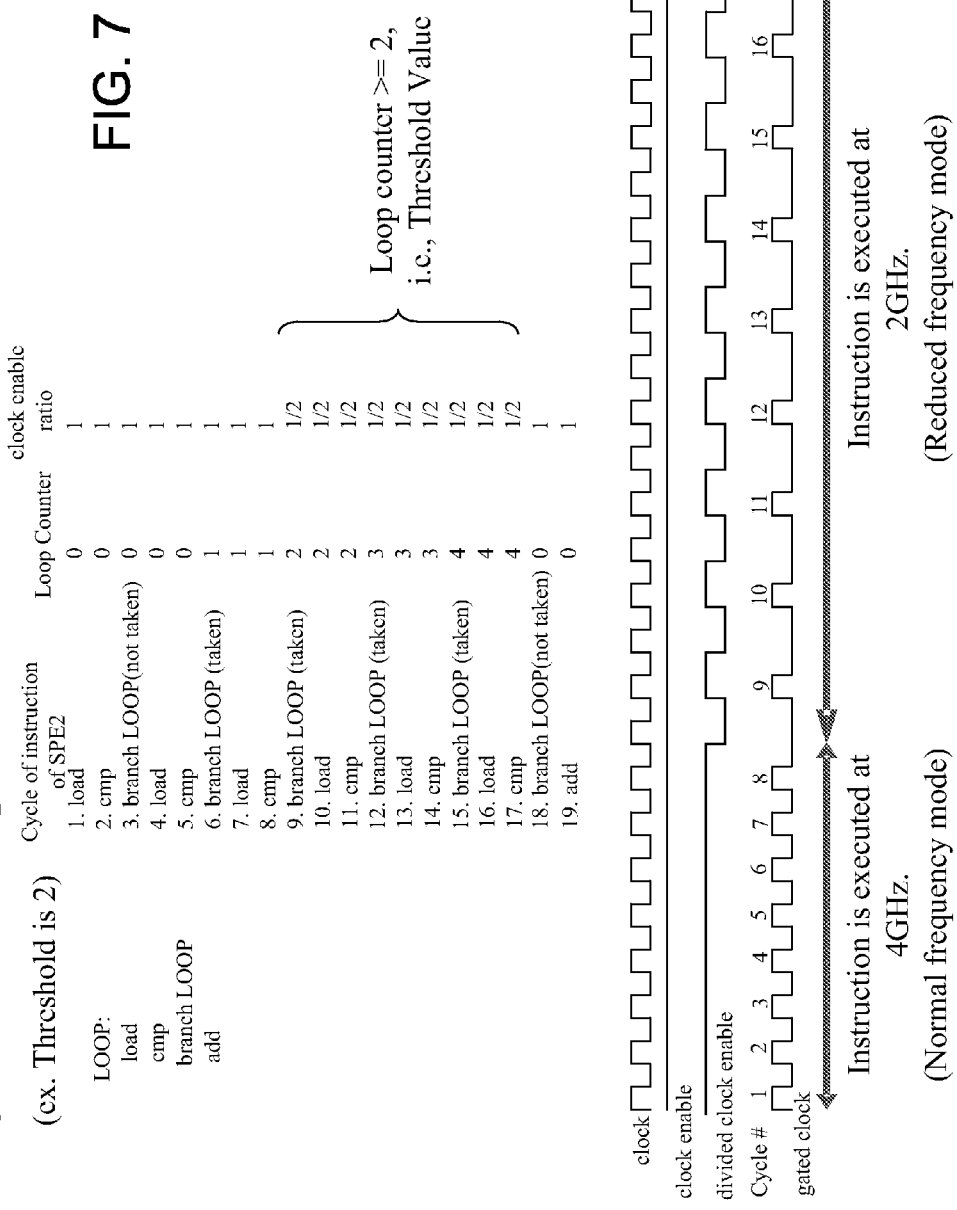
FIG. 7 is a block diagram illustrating an exemplary synchronization operation in accordance with one or more preferred aspects of the present invention.

Referring to FIG. 7, a block diagram illustrates an exemplary synchronization operation in accordance with one or more preferred aspects of the present invention. As in the above example of FIG. 4, processors SPE1 and SPE2 are operating in synchronization. While no lock is present (cycles 1-5), SPE2 operates at its normal, initial frequency with a loop count of zero. As SPE1 locks data that must remain unchanged by other processors, e.g. SPE2, SPE2 may not access the data, and because SPE2 must operate on the locked data before moving on to another task, SPE2 enters into a loop (cycle 6), adding one to the loop count. In cycles 7 and 8, SPE2 is still in a wait loop, but as the loop count of 1 is below the threshold value of 2, the frequency of SPE2 remains unchanged.

In the loop, SPE2 loads the lock value, compares the lock value, and branches to the wait loop again (cycle 9) because the lock value for the data indicates that a lock on the data is not available to SPE2. The loop count increases by 1, thus equaling 2, the threshold value, causing the frequency to be reduced to half (ratio of 1/2). Although the wait period is generally a significant number of clock cycles, it has been shortened here for purposes of illustration. Continuing to loop in cycles 10 to 17, the loop count increases and the frequency remains reduced to half. At cycle 18, the data become available, SPE2 does not take the loop branch, and the loop counter is reset to zero. With the loop count below the threshold value, the frequency is returned to normal for cycles 18 and 19.

The frequency is considered normal when it has a clock enable ratio of 1:1 to the initial frequency, considering that the initial frequency may vary based on processing and environmental circumstances. The initial frequency is considered normal insofar as the processor SPE2 presumably would operate at its fastest, optimal or recommended frequency when performing productive processing under normal circumstances. As each given processor 110 may have a different frequency that is considered normal for the given processor 110, what is a normal frequency for SPE1 may differ from what is a normal frequency for SPE2. Similarly, what is normal for SPE1 under a first set of conditions may not be normal for SPE1 under a second set of conditions. Hence, when the frequency of a select processor 110 is increased after previously having been reduced, the reference frequency at which the select processor 110 again may operate defaults to the initial frequency at which the select processor 110 was operating before having its frequency reduced.

However, the increase in frequency likewise may be progressive and need not immediately return to the initial frequency. Moreover, the frequency increase may cause the select processor 110 to operate at a frequency higher than the initial frequency, if conditions and configurations allow it. Power savings considerations may warrant a progressive increase in the frequency, such as available battery power, relative importance of the processing being performed, and dependency on data to be computed by another waiting processor. For instance, if processor 110B waits on processor 110A, and meanwhile processor 110D is waiting on processor 110C, and the result of processor 110B is destined for processor 110D, even once processor 110B stops waiting, it may not be useful to fully increase the frequency of processor 110B if processor 110D is waiting still and not ready to receive the result from processor 110B.

While the present invention has been described with reference to various preferred embodiments, it should be clear to a person of ordinary skill in the art that the present invention may be implemented using other means of tracking the pendency of waiting periods of waiting processors. Broadly speaking, the invention does not require the use of a loop count to determine the duration of the waiting period. Any appropriate means may be used, such as delay times, periods of unavailability of the specific data, etc. As such, the loop count monitor may be replaced more broadly with a waiting period monitor operable to measure the waiting period and track waiting period data. In general, the invention may include tracking waiting data relating to waiting processor waiting for data to become available; analyzing the waiting data to create a waiting data analysis outcome; and determining the frequency of the waiting processor in view of the waiting data analysis outcome.

For instance, the availability monitor 216 may track the availability of data. When a lock is put on a data block, the lock may be registered with the availability monitor 216. Any data requests would check with the availability monitor 216 to learn whether the desired data are available. If not, the frequency of the processor requiring the data may be reduced until the desired data become available, at which point the availability monitor 216 notifies the waiting processor and the frequency of the waiting processor is restored to normal.

In accordance with one or more embodiments, the multi-processor system 100 may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system 100 must complete tasks in a short and predictable time.

To this end, and in accordance with this computer architecture, all processors of a multi-processing computer system 100 are constructed from a common computing module (or cell). This common computing module has a consistent structure and preferably employs the same instruction set architecture. The multi-processing computer system 100 can be formed of one or more clients, servers, PCs, mobile computers, game machines, PDAs, set top boxes, appliances, digital televisions and other devices using computer processors.

A plurality of the computer systems 100 also may be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 8:
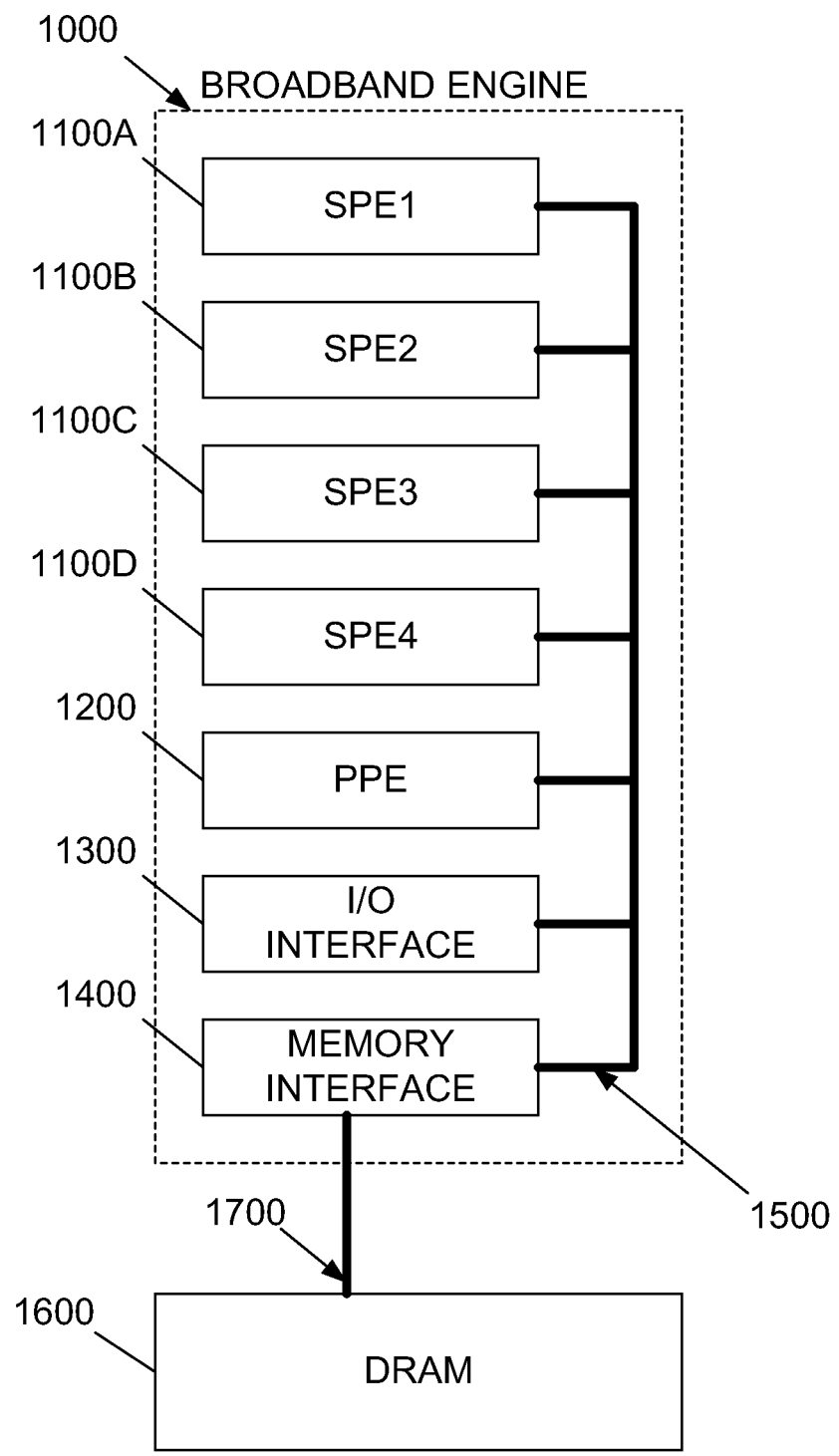
FIG. 8 is a diagram illustrating a broadband engine (BE) that may be used to implement one or more further aspects of the present invention.
Figure 9:
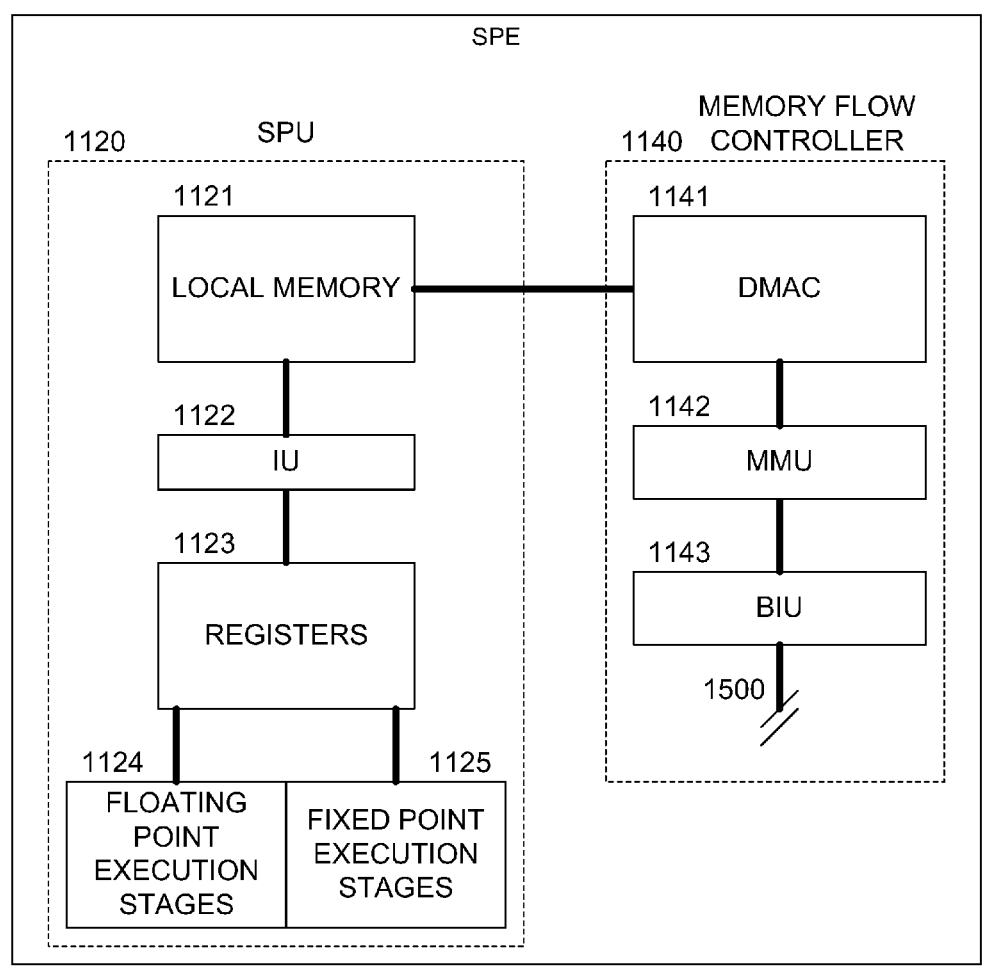
FIG. 9 is a diagram illustrating the structure of an exemplary synergistic processing element (SPE) of the system of FIG. 8 that may be adapted in accordance with one or more further aspects of the present invention.
Figure 10:
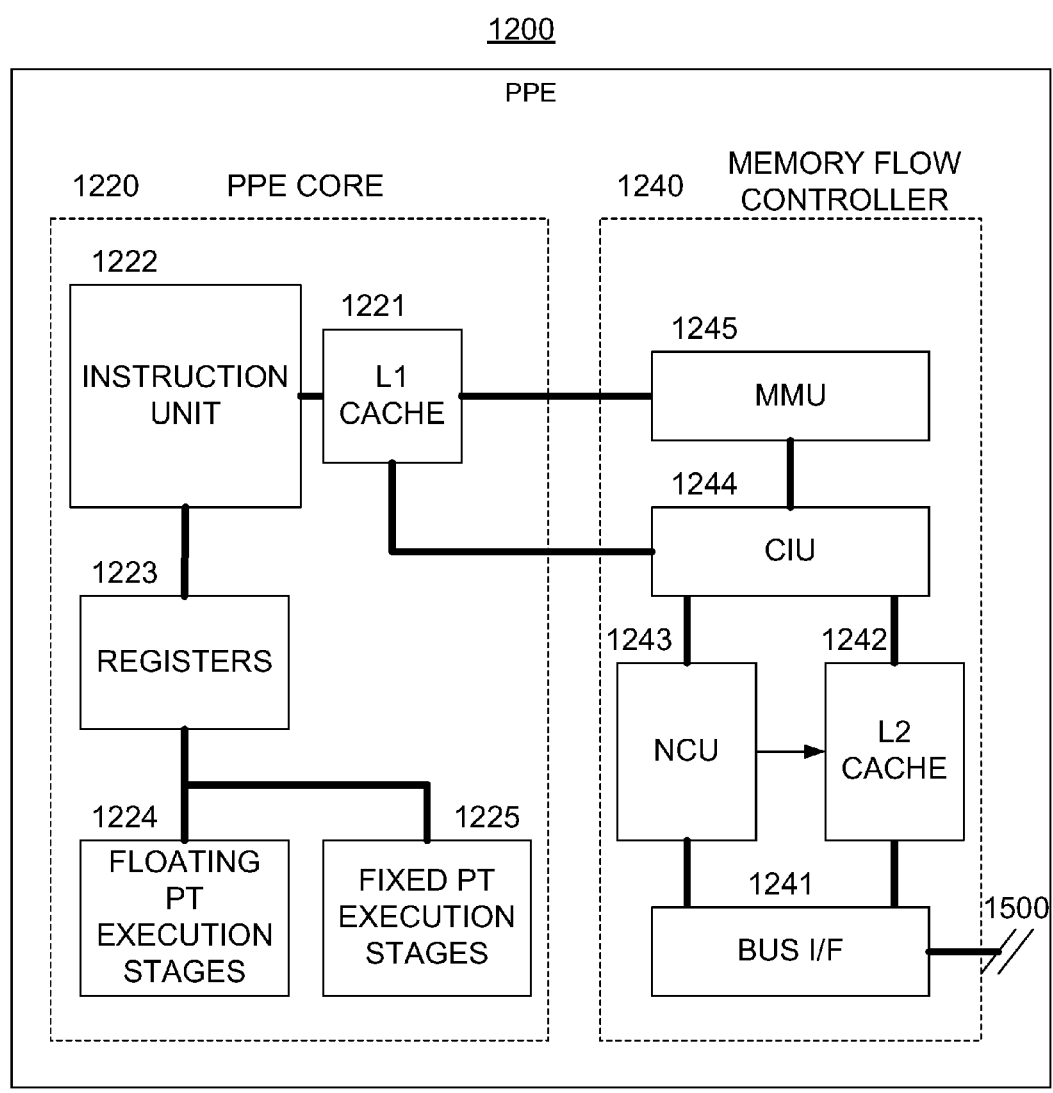
FIG. 10 is a diagram illustrating the structure of an exemplary POWER processing element (PPE) of the system of FIG. 8 that may be adapted in accordance with one or more further aspects of the present invention.

A description of a preferred computer architecture for a multi-processor system is provided in FIG. 8 to FIG. 10 that is suitable for carrying out one or more of the features discussed herein.

Referring to FIG. 8, a preferred structure of a basic processing module is shown as a broadband engine (BE) 1000. The BE 1000 comprises an I/O interface 1300, a POWER processing element (PPE) 1200, and a plurality of synergistic processing elements 1100, namely, synergistic processing element 1100A, synergistic processing element 1100B, synergistic processing element 1100C, and synergistic processing element 1100D. A local (or internal) BE bus 1500 transmits data and applications among the PPE 1200, the synergistic processing elements 1100, and a memory interface 1400. The local BE bus 1500 can have, e.g., a conventional architecture or can be implemented as a packet-switched network. If implemented as a packet switch network, while requiring more hardware, increases the available bandwidth.

The BE 1000 can be constructed using various methods for implementing digital logic. The BE 1000 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The BE 1000 also may be implemented using superconducting material, e.g., rapid single-flux-quantum (RSFQ) logic.

The BE 1000 is closely associated with a shared (main) memory 1600 through a high bandwidth memory connection 1700. Although the memory 1600 preferably is a dynamic random access memory (DRAM), the memory 1600 could be implemented using other means, e.g., as a static random access memory (SRAM), a magnetic random access memory (MRAM), an optical memory, a holographic memory, etc.

The PPE 1200 and the synergistic processing elements 1100 are preferably each coupled to a memory flow controller (MFC) including direct memory access DMA functionality, which in combination with the memory interface 1400, facilitate the transfer of data between the DRAM 1600 and the synergistic processing elements 1100 and the PPE 1200 of the BE 1000. It is noted that the DMAC and/or the memory interface 1400 may be integrally or separately disposed with respect to the synergistic processing elements 1100 and the PPE 1200. Indeed, the DMAC function and/or the memory interface 1400 function may be integral with one or more (preferably all) of the synergistic processing elements 1100 and the PPE 1200. It is also noted that the DRAM 1600 may be integrally or separately disposed with respect to the BE 1000. For example, the DRAM 1600 may be disposed off-chip as is implied by the illustration shown or the DRAM 1600 may be disposed on-chip in an integrated fashion.

The PPE 1200 can be, e.g., a standard processor capable of stand-alone processing of data and applications. In operation, the PPE 1200 preferably schedules and orchestrates the processing of data and applications by the synergistic processing elements. The synergistic processing elements preferably are single instruction, multiple data (SIMD) processors. Under the control of the PPE 1200, the synergistic processing elements perform the processing of these data and applications in a parallel and independent manner. The PPE 1200 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PPE 1200 may be implemented by one of the synergistic processing elements 1100 taking on the role of a main processing unit that schedules and orchestrates the processing of data and applications by the synergistic processing elements 1100. Further, there may be more than one PPE implemented within the broadband engine 1000.

In accordance with this modular structure, the number of BEs 1000 employed by a particular computer system is based upon the processing power required by that system. For example, a server may employ four BEs 1000, a workstation may employ two BEs 1000 and a PDA may employ one BE 1000. The number of synergistic processing elements 1100 of a BE 1000 assigned to processing a particular software cell depends upon the complexity and magnitude of the programs and data within the cell.

Referring to FIG. 9, a preferred structure of a synergistic processing element (SPE) 1100 is illustrated. The SPE 1100 architecture preferably fills a void between general-purpose processors (which are designed to achieve high average performance on a broad set of applications) and special-purpose processors (which are designed to achieve high performance on a single application). The SPE 1100 is designed to achieve high performance on game applications, media applications, broadband systems, etc., and to provide a high degree of control to programmers of real-time applications. Some capabilities of the SPE 1100 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The synergistic processing element 1100 includes two basic functional units, namely a streaming processing unit (SPU) 1120 and a memory flow controller (MFC) 1140. The SPU 1120 performs program execution, data manipulation, etc., while the MFC 1140 performs functions related to data transfers between the SPU 1120 and the DRAM 1600 of the system.

The SPU 1120 includes a local memory 1121, an instruction unit (IU) 1122, registers 1123, one or more floating point execution stages 1124 and one or more fixed point execution stages 1125. The local memory 1121 is preferably implemented using single-ported random access memory, such as an SRAM. Whereas most processors reduce latency to memory by employing caches, the SPU 1120 implements the relatively small local memory 1121 rather than a cache. Indeed, in order to provide consistent and predictable memory access latency for programmers of real-time applications (and other applications as mentioned herein) a cache memory architecture within the SPU 1120 is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 1121 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the synergistic processing elements 1100 references the associated local memory 1121 using a local address. However, each location of the local memory 1121 is also assigned a real address (RA) within the memory map of the overall system. This allows Privilege Software to map a local memory 1121 into the Effective Address (EA) of a process to facilitate DMA transfers between one local memory 1121 and another local memory 1121. The PPE 1200 can also directly access the local memory 1121 using an effective address. In a preferred embodiment, the local memory 1121 contains 556 kilobytes of storage, and the capacity of registers 1123 is 128×128 bits.

The SPU 1120 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 1122 includes an instruction buffer, instruction decode circuitry, dependency check circuitry, and instruction issue circuitry.

The instruction buffer preferably includes a plurality of registers that are coupled to the local memory 1121 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 1121, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decode circuitry simultaneously.

The instruction issue circuitry is operable to issue the instructions to the floating point execution stages 1124 and/or the fixed point execution stages 1125.

The registers 1123 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU 1120 is of a superscalar architecture, such that more than one instruction is issued per clock cycle. The SPU 1120 preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 1124 and fixed point execution stages 1125 may be employed. In a preferred embodiment, the floating point execution stages 1124 operate at a speed of 32 billion floating point operations per second (32 GFLOPS), and the fixed point execution stages 1125 operate at a speed of 32 billion operations per second (32 GOPS).

The MFC 1140 preferably includes a direct memory access controller (DMAC) 1141, a memory management unit (MMU) 1142, and a bus interface unit (BIU) 1143. With the exception of the DMAC 1141, the MFC 1140 preferably runs at half frequency (half speed) as compared with the SPU 1120 and the bus 1500 to meet low power dissipation design objectives. The MFC 1140 is operable to handle data and instructions coming into the SPE 1100 from the bus 1500, provides address translation for the DMAC, and snoop-operations for data coherency. The BIU 1143 provides an interface between the bus 1500 and the MMU 1142 and DMAC 1141. Thus, the SPE 1100 (including the SPU 1120 and the MFC 1140) and the DMAC 1141 are connected physically and/or logically to the bus 1500.

The MMU 1142 is preferably operable to translate effective addresses (taken from DMA commands) into real addresses for memory access. For example, the MMU 1142 may translate the higher order bits of the effective address into real address bits. The lower-order address bits, however, are preferably untranslatable and are considered both logical and physical for use to form the real address and request access to memory. In one or more embodiments, the MMU 1142 may be implemented based on a 64-bit memory management model, and may provide $2^{64}$ bytes of effective address space with 4K-, 64K-, 1M-, and 16M-byte page sizes and 256 MB segment sizes. Preferably, the MMU 1142 is operable to support up to $2^{65}$ bytes of virtual memory, and $2^{42}$ bytes (4 TeraBytes) of physical memory for DMA commands. The hardware of the MMU 1142 may include an 8-entry, fully associative SLB, a 256-entry, 4 way set associative TLB, and a 4×4 Replacement Management Table (RMT) for the TLB—used for hardware TLB miss handling.

The DMAC 1141 is preferably operable to manage DMA commands from the SPU 1120 and one or more other devices such as the PPE 1200 and/or the other SPUs. There may be three categories of DMA commands: Put commands, which operate to move data from the local memory 1121 to the shared memory 1600; Get commands, which operate to move data into the local memory 1121 from the shared memory 1600; and Storage Control commands, which include SLI commands and synchronization commands. The synchronization commands may include atomic commands, send signal commands, and dedicated barrier commands. In response to DMA commands, the MMU 1142 translates the effective address into a real address and the real address is forwarded to the BIU 1143.

The SPU 1120 preferably uses a channel interface and data interface to communicate (send DMA commands, status, etc.) with an interface within the DMAC 1141. The SPU 1120 dispatches DMA commands through the channel interface to a DMA queue in the DMAC 1141. Once a DMA command is in the DMA queue, it is handled by issue and completion logic within the DMAC 1141. When all bus transactions for a DMA command are finished, a completion signal is sent back to the SPU 1120 over the channel interface.

Referring to FIG. 10, a preferred structure of the PPE 1200 is illustrated. The PPE 1200 includes two basic functional units, the PPE core 1220 and the memory flow controller (MFC) 1240. The PPE core 1220 performs program execution, data manipulation, multi-processor management functions, etc., while the MFC 1240 performs functions related to data transfers between the PPE core 1220 and the memory space of the system 100.

The PPE core 1220 may include an L1 cache 1221, an instruction unit 1222, registers 1223, one or more floating point execution stages 1224 and one or more fixed point execution stages 1225. The L1 cache 1221 provides data caching functionality for data received from the shared memory 1600, the processors 1100, or other portions of the memory space through the MFC 1240. As the PPE core 1220 is preferably implemented as a superpipeline, the instruction unit 1222 is preferably implemented as an instruction pipeline with many stages, including fetching, decoding, dependency checking, issuing, etc. The PPE core 1220 is also preferably of a superscalar configuration, whereby more than one instruction is issued from the instruction unit 1222 per clock cycle. To achieve a high processing power, the floating point execution stages 1224 and the fixed point execution stages 1225 include a plurality of stages in a pipeline configuration. Depending upon the required processing power, a greater or lesser number of floating point execution stages 1224 and fixed point execution stages 1225 may be employed.

The MFC 1240 includes a bus interface unit (BIU) 1241, an L2 cache memory 1242, a non-cachable unit (NCU) 1243, a core interface unit (CIU) 1244, and a memory management unit (MMU) 1245. Most of the MFC 1240 runs at half frequency (half speed) as compared with the PPE core 1220 and the bus 1500 to meet low power dissipation design objectives.

The BIU 1241 provides an interface between the bus 1500 and the L2 cache 1242 and NCU 1243 logic blocks. To this end, the BIU 1241 may act as a Master as well as a Slave device on the bus 1500 in order to perform fully coherent memory operations. As a Master device it may source load/store requests to the bus 1500 for service on behalf of the L2 cache 1242 and the NCU 1243. The BIU 1241 may also implement a flow control mechanism for commands which limits the total number of commands that can be sent to the bus 1500. The data operations on the bus 1500 may be designed to take eight beats and, therefore, the BIU 1241 is preferably designed around 128 byte cache-lines and the coherency and synchronization granularity is 128 KB.

The L2 cache memory 1242 (with supporting hardware logic) is preferably designed to cache 512 KB of data. For example, the L2 cache 1242 may handle cacheable loads/stores, data pre-fetches, instruction fetches, instruction pre-fetches, cache operations, and barrier operations. The L2 cache 1242 is preferably an 8-way set associative system. The L2 cache 1242 may include six reload queues matching six (6) castout queues (e.g., six RC machines), and eight (64-byte wide) store queues. The L2 cache 1242 may operate to provide a backup copy of some or all of the data in the L1 cache 1221. Advantageously, this is useful in restoring state(s) when processing nodes are hot-swapped. This configuration also permits the L1 cache 1221 to operate more quickly with fewer ports, and permits faster cache-to-cache transfers (because the requests may stop at the L2 cache 1242). This configuration also provides a mechanism for passing cache coherency management to the L2 cache memory 1242.

The NCU 1243 interfaces with the CIU 1244, the L2 cache memory 1242, and the BIU 1241 and generally functions as a queuing/buffering circuit for non-cacheable operations between the PPE core 1220 and the memory system. The NCU 1243 preferably handles all communications with the PPE core 1220 that are not handled by the L2 cache 1242, such as cache-inhibited load/stores, barrier operations, and cache coherency operations. The NCU 1243 is preferably run at half speed to meet the aforementioned power dissipation objectives.

The CIU 1244 is disposed on the boundary of the MFC 1240 and the PPE core 1220 and acts as a routing, arbitration, and flow control point for requests coming from the execution stages 1224, 1225, the instruction unit 1222, and the MMU unit 1245 and going to the L2 cache 1242 and the NCU 1243. The PPE core 1220 and the MMU 1245 preferably run at full speed, while the L2 cache 1242 and the NCU 1243 are operable for a 2:1 speed ratio. Thus, a frequency boundary exists in the CIU 1244 and one of its functions is to properly handle the frequency crossing as it forwards requests and reloads data between the two frequency domains.

The CIU 1244 is comprised of three functional blocks: a load unit, a store unit, and reload unit. In addition, a data pre-fetch function is performed by the CIU 1244 and is preferably a functional part of the load unit. The CIU 1244 is preferably operable to: (i) accept load and store requests from the PPE core 1220 and the MMU 1245; (ii) convert the requests from full speed clock frequency to half speed (a 2:1 clock frequency conversion); (iii) route cachable requests to the L2 cache 1242, and route non-cachable requests to the NCU 1243; (iv) arbitrate fairly between the requests to the L2 cache 1242 and the NCU 1243; (v) provide flow control over the dispatch to the L2 cache 1242 and the NCU 1243 so that the requests are received in a target window and overflow is avoided; (vi) accept load return data and route it to the execution stages 1224, 1225, the instruction unit 1222, or the MMU 1245; (vii) pass snoop requests to the execution stages 1224, 1225, the instruction unit 1222, or the MMU 1245; and (viii) convert load return data and snoop traffic from half speed to full speed.

The MMU 1245 preferably provides address translation for the PPE core 440A, such as by way of a second level address translation facility. A first level of translation is preferably provided in the PPE core 1220 by separate instruction and data ERAT (effective to real address translation) arrays that may be much smaller and faster than the MMU 1245.

In a preferred embodiment, the PPE 1200 operates at 4-6 GHz, 10F04, with a 64-bit implementation. The registers are preferably 64 bits long (although one or more special purpose registers may be smaller) and effective addresses are 64 bits long. The instruction unit 1222, registers 1223 and execution stages 1224 and 1225 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of reducing power consumption of a processing system having a first processor operating at a first frequency and a second processor operating at a second frequency, the method comprising:
   determining that the second processor has requested data that the first processor has locked; and
   reducing the second frequency from a second initial frequency to a non-zero, second reduced frequency based on a number of wait loops taken by the second processor while waiting for the data to become available.

2. The method of claim 1, further comprising:
   counting a sequence of wait loops taken by the second processor while waiting for the data to become available, each wait loop in the sequence increasing a loop count of a counter by one;
   comparing the loop count to the threshold value; and
   reducing the second frequency when the loop count equals or exceeds the threshold value.

3. The method of claim 2, further comprising:
keeping the loop count at zero while the second processor is not in a sequence of wait loops; and
keeping the second frequency at the second initial frequency when the loop count is zero.

4. The method of claim 2, further comprising:
resetting the loop count to zero when the sequence of wait loops ends because the second processor does not take the wait loop branch; and
increasing the second frequency from the second reduced frequency to a second increased frequency when the loop count is reset to zero;
wherein the second increased frequency is greater than the second reduced frequency and is either less than, equal to or greater than the second initial frequency.

5. The method of claim 4, wherein:
monitoring availability of the data;
identifying when the first processor releases the lock on the data that caused the waiting processor to wait; and
causing the second processor not to take the wait loop branch when the first processor releases the lock on the data.

6. The method of claim 1, further comprising:
tracking waiting data relating to the second processor waiting for data to become available;
analyzing the waiting data to create a waiting data analysis outcome; and
determining the second frequency in view of the waiting data analysis outcome.

7. The method of claim 1, further comprising: increasing the second frequency to a second increased frequency from the second reduced frequency when the waiting period ends.

8. The method of claim 7, wherein at least one of:
increasing the second frequency includes restoring the second frequency to the second initial frequency from the second reduced frequency when the waiting period ends; and
the second frequency is increased progressively.

9. The method of claim 1, wherein the step of reducing includes progressively reducing the second frequency from the second initial frequency to the non-zero, second reduced frequency as a duration of the waiting period increases.

10. An apparatus, comprising:
a first processor operating at a first frequency; and
a second processor operating at a second frequency,
a monitor circuit configured to determine when the second processor has requested data that the first processor has locked; and
a frequency circuit operating to: (i) reduce the second frequency from a second initial frequency to a non-zero, second reduced frequency based on a number of wait loops taken by the second processor while waiting for the data to become available, (ii) progressively reducing the second frequency from the second initial frequency to the non-zero, second reduced frequency as a duration of waiting increases, and (iii) increase the second frequency to a second increased frequency progressively from the second reduced frequency when the requested data are released.

11. The apparatus of claim 10, wherein:
the monitor circuit includes a waiting period monitor having a loop count monitor; wherein the loop count monitor operates to count a sequence of wait loops taken by the second processor while waiting for the data to become available, each wait loop in the sequence increasing a loop count of the counter by one;
a controller operates to compare the loop count to the threshold value; and
the controller operates to cause the frequency circuit to reduce the second frequency when the loop count equals or exceeds the threshold value.

12. The apparatus of claim 11, wherein:
the loop count monitor operates to keep the loop count at zero while the second processor is not in a sequence of wait loops; and
the controller operates to keep the second frequency at the second initial frequency when the loop count is zero.

13. The apparatus of claim 11, wherein:
the controller operates to reset the loop count to zero when the sequence of wait loops ends because the second processor does not take the wait loop branch; and
the controller operates to cause the frequency circuit to increase the second frequency from the second reduced frequency to a second increased frequency when the loop count is reset to zero;
wherein the second increased frequency is greater than the second reduced frequency and is either less than, equal to or greater than the second initial frequency.

14. The apparatus of claim 10, wherein:
the waiting period monitor comprises a first software component;
the frequency circuit comprises a second software component;
the availability monitor comprises a third software component; and
the controller comprises a fourth software component.

15. The apparatus claim 14, wherein:
the first, second, third and fourth software components are executable on the processing system.

16. The apparatus of claim 10, wherein at least one of:
the controller further operates to cause the frequency circuit to increase the second frequency to a second increased frequency from the second reduced frequency when the data become available;
increasing the second frequency includes restoring the second frequency to the second initial frequency from the second reduced frequency when the waiting period ends;
the second frequency is increased progressively; and
the second frequency is reduced progressively as the waiting period lengthens.

17. A non-transitory, computer-readable storage medium containing computer-executable instructions capable of causing a processing system to perform actions for reducing power consumption of the processing system having a first processor operating at a first frequency and a second processor operating at a second frequency, the actions comprising:
determining that the second processor has requested data that the first processor has locked;
reducing the second frequency from a second initial frequency to a non-zero, second reduced frequency based on a number of wait loops taken by the second processor while waiting for the data to become available.

18. The computer-readable storage medium of claim 17, the actions further comprising:
counting a sequence of wait loops taken by the second processor while waiting for the data to become available, each wait loop in the sequence increasing a loop count of a counter by one;
comparing the loop count to the threshold value; and
reducing the second frequency when the loop count equals or exceeds the threshold value.

19. The computer-readable storage medium of claim 18, the actions further comprising:
  keeping the loop count at zero while the second processor is not in a sequence of wait loops; and
  keeping the second frequency at the second initial frequency when the loop count is zero.

20. The computer-readable storage medium of claim 18, the actions further comprising:
  resetting the loop count to zero when the sequence of wait loops ends because the second processor does not take the wait loop branch; and
  increasing the second frequency from the second reduced frequency to a second increased frequency when the loop count is reset to zero;
  wherein the second increased frequency is greater than the second reduced frequency and is either less than, equal to or greater than the second initial frequency.

21. The computer-readable storage medium of claim 20, the actions further comprising:
  monitoring availability of the data;
  identifying when the first processor releases the lock on the data that caused the waiting processor to wait; and
  causing the second processor not to take the wait loop branch when the first processor releases the lock on the data.

22. The computer-readable storage medium of claim 17, the actions further comprising:
  tracking waiting data relating to the second processor waiting for data to become available;
  analyzing the waiting data to create a waiting data analysis outcome; and
  determining the second frequency in view of the waiting data analysis outcome.

23. The computer-readable storage medium of claim 17, the actions further comprising: increasing the second frequency to a second increased frequency from the second reduced frequency when the waiting period ends.

24. The computer-readable storage medium of claim 23, wherein at least one of:
  increasing the second frequency includes restoring the second frequency to the second initial frequency from the second reduced frequency when the waiting period ends;
  the second frequency is increased progressively; and
  the second frequency is reduced progressively as the waiting period lengthens.

* * * * *